Figure 1:
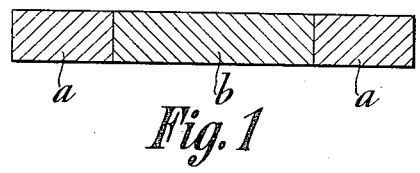

W. LÖW.
PROCESS FOR THE MANUFACTURE OF THERMO ELEMENTS.
APPLICATION FILED AUG. 4, 1915.

1,232,062.

Patented July 3, 1917.

Wilhelm Löw.

UNITED STATES PATENT OFFICE.

WILHELM LÖW, OF HEIDELBERG, GERMANY, ASSIGNOR TO THE FIRM OF SCHOTT & GEN., OF JENA, GERMANY.

PROCESS FOR THE MANUFACTURE OF THERMO ELEMENTS.

1,232,062.      Specification of Letters Patent.      Patented July 3, 1917.

Application filed August 4, 1915. Serial No. 43,695.

*To all whom it may concern:*

Be it known that I, WILHELM LÖW, a citizen of the German Empire, residing at Heidelberg, Germany, have invented a new and useful Process for the Manufacture of Thermo Elements, of which the following is a specification.

The present invention relates to a process for the manufacture of thermo-elements, each of which is formed of two thin and narrow metal strips, which are joined together. According to the invention such thermo-elements are made by joining to a sheet of one of the metals along one of its edges a sheet of the other metal, subsequently rolling the joined sheets along the joint to the required thickness and finally dividing them into strips of the required width, which cross the joint (in general perpendicularly).

The new process offers the advantage, that thermo-elements of considerable thinness may be manufactured, without its being necessary to deal, when making the joint, with such thin bodies, which could naturally be handled only with great care.

In what way the two sheets are joined together is in the present case of no importance. The sheets may for instance be soldered together with a small lap or may be joined together with a small lap by electric welding or may be allowed to butt against one another and be welded together (on one side or on both sides of the joint) by the blow of a hammer with a glowing platinum wire, which is laid over the joint.

Preferably, before the rolling, the sheet of one metal is joined not only along one of its edges with a sheet of the other metal, but it is joined along each of two opposite edges to a sheet of the other metal, so that the middle sheet is thus joined along two more or less parallel joints to the two other sheets. Thus the advantage is gained, that the two sheets, even when (as is usually the case) the two metals behave differently under the rolls, do not get distorted when being rolled or that they do not tear asunder. It is understood that, instead of joining only three sheets together in the manner described, a greater uneven number of symmetrically disposed sheets may be joined together.

Even in the case where the two metals behave alike under the rolls there is still an advantage in joining three sheets together in the manner described, when it is a question of making thermo-element combinations, each of which consists of two thermo-elements, which are joined together in such a manner, that the free end of one of them joined onto the free end belonging to the same metal of the other one. Such a combination is obtained from the three sheets, which are joined and rolled together, by cutting from these three sheets a strip crossing the two joints; it therefore becomes unnecessary to combine two thermo-elements to form such a combination.

Figure 2:
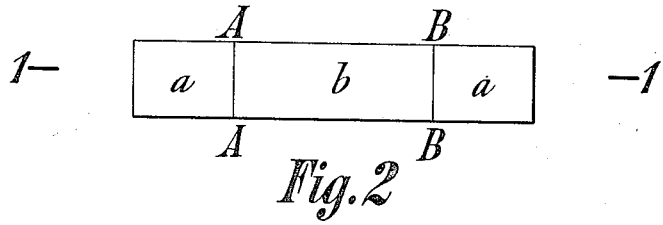
Figure 3:
Figure 4:
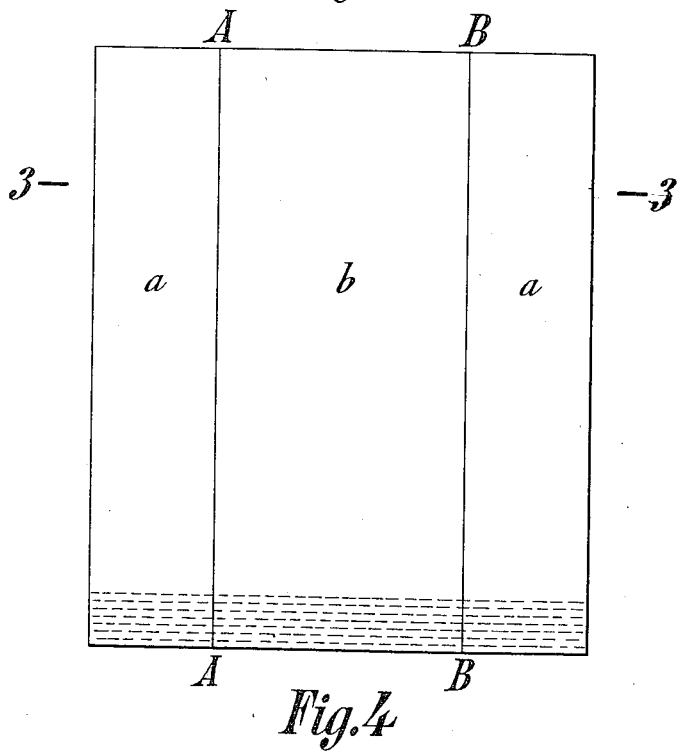

In the annexed drawing Figures 1 and 2 illustrate for example in an enlarged scale the first steps of a process according to the invention, Fig. 1 being a cross-section and Fig. 2 being a plan-view. Figs. 3 and 4 illustrate the further steps of the process.

In Fig. 1 two strips $a$ of one metal are welded each on one side of a strip $b$ of another metal. By rolling this joined sheet in the direction of the lines A A and B B a sheet is obtained as shown in Fig. 2, the length of the new sheet being much greater than the length of the sheet shown in Fig. 1, while the thinness of the new sheet is much smaller than the thinness of the sheet shown in Fig. 1. By dividing the sheet along lines as shown by the dotted lines in Fig. 4 a plurality of thermo-element combinations is obtained, each of which consists of two thermo-elements, which are joined together in such a manner, that the free end of one of them joint onto the free end belonging to the same metal of the other one. If single thermo-elements are required each of the just named thermo-element combinations is to be divided in the middle of the part $b$.

I claim:

1. Process for the manufacture of thermo-elements consisting in joining to a sheet of one metal along its edge a sheet of another metal, rolling the sheets, thus joined, along the joint, until the required thickness is obtained, and finally dividing them across the joint into strips of the required width.

2. Process for the manufacture of thermo-elements consisting in joining to a sheet of one metal along each of two opposite edges a sheet of another metal, rolling the sheets, thus joined, along the joints until the required thickness is obtained and finally dividing them across the joints into strips of the required width.

WILHELM LÖW.